July 17, 1928.
W. H. ADKINS
LAWN MOWER
Filed Dec. 6, 1926
1,677,377
2 Sheets-Sheet 1
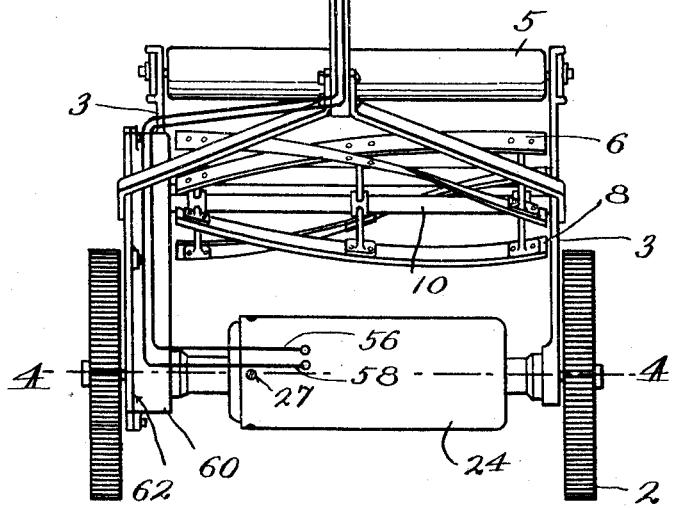
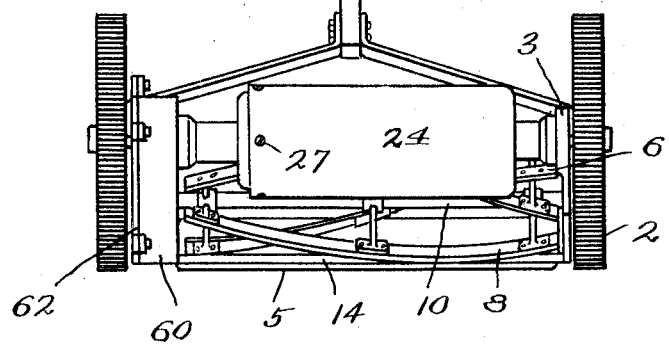
Witness:
Fred C. Fischer.
Inventor:
William H. Adkins,
By F. G. Fischer,
Attorney.

July 17, 1928.

W. H. ADKINS

LAWN MOWER

Filed Dec. 6, 1926

Witness:
Fred C. Fischer.

Inventor:
William H. Adkins,

By
F. G. Fischer,
Attorney

Patented July 17, 1928.

1,677,377

UNITED STATES PATENT OFFICE.

WILLIAM H. ADKINS, OF KANSAS CITY, MISSOURI.

LAWN MOWER.

Application filed December 6, 1926. Serial No. 152,886.

My invention relates to improvements in lawn-mowers and my object is to provide a machine of this character in which the rotary cutter is driven independently of the carrier wheels so that grass may be cut when desired while the machine is standing still as well as when moving forward.

Another object is to provide a machine of this character in which the rotary cutter is driven by a small but powerful motor so that said cutter is not likely to become stalled while cutting grass and other vegetation.

A further object is to provide a compact machine which is of relatively simple and inexpensive construction and one which is not apt to get out of order.

Other objects will hereinafter appear and in order that the invention may be fully understood reference will now be had to the accompanying drawings, in which:

Fig. 1 is a plan view of the lawn-mower.

Fig. 2 is a front elevation of the lawn-mower.

Figure 3:
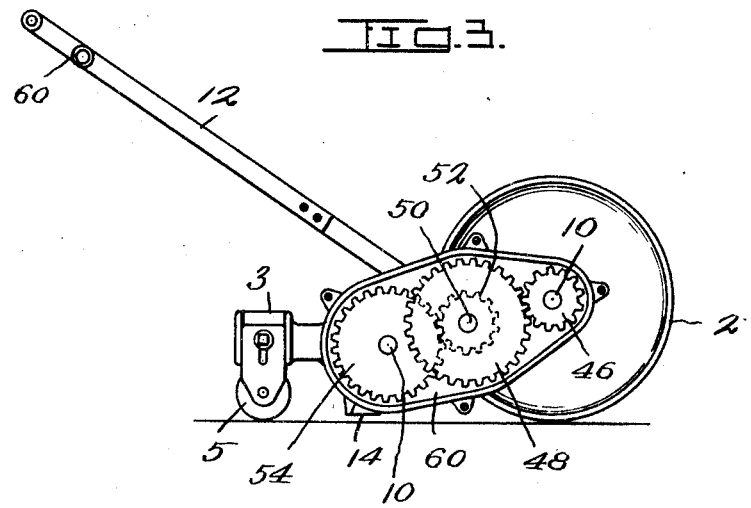
Fig. 3 is a side elevation of the lawn mower with the face plate of the gear case removed.
Figure 4:
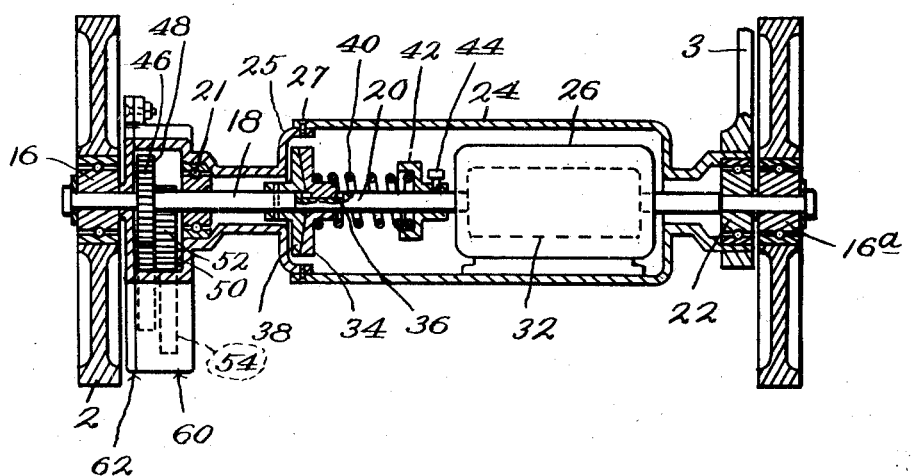
Fig. 4 is an enlarged section on line 4—4 of Fig. 1.

Referring in detail to the different parts, 2 designates the carrier wheels of the lawn-mower, 3 the frame, 5 the roller, 6 the rotary cutter which embodies a plurality of blades 8, 10 the shaft upon which the rotary cutter 6 is mounted, 12 the handle for pushing and guiding the lawn-mower, and 14 the ledger plate which cooperates with the blades 8 in cutting grass and other growing vegetation. The foregoing parts may be of ordinary construction, excepting that the carrier wheels 2 are not geared to the rotary cutter 6 to drive the same, but run freely upon ball bearings 16 and 16ª mounted upon axially alined shaft sections 18 and 20 journaled in bearings 21 and 22, respectively, mounted within the ends of a horizontally disposed housing 24 which encloses a motor 26. The housing 24 extends transversely across the lawn-mower and is secured at one end to the frame 3 and at its opposite end to a gear case 60. For convenience of assembling the mechanism located within the housing 24, the latter is provided with an end 25 which is removably held in place by screws 27.

The motor 26 is preferably in the form of an electric motor with its armature 32 fixedly mounted upon the shaft section 20 to drive the same. One end of the shaft section 20 is provided with a clutch member 34 which is slidably mounted upon said shaft section 20 and caused to rotate therewith through the intermediary of a groove-and-feather connection 36. The clutch member 34 is held in frictional engagement with a companion clutch member 38 which is fixedly mounted upon the shaft section 18. A coil spring 40 is interposed between a collar 42 and the clutch member 34 for holding the latter in engagement with the clutch member 38. The collar 42 is secured to the shaft section 20 by suitable means such as a set screw 44 so that said collar 42 may be adjusted for the purpose of tensioning the spring 40.

The shaft section 18 drives the rotary cutter 6 through the intermediary of a gear train consisting of a pinion 46 fixedly mounted upon the shaft section 18, a large cog wheel 48 intermeshing with the pinion 46 and mounted upon a shaft 50, a small cog wheel 52 connected to the cog wheel 48 to rotate therewith, and a large cog wheel 54 fixedly mounted upon the cutter shaft 10 and intermeshing with the small cog wheel 52.

The train of gears above described are proportioned to drive the rotary cutter 6 at a slower speed than that at which the armature 32 rotates, so that ample power may be had for driving said rotary cutter 6 and also to prevent undue wear on the blades 8 and the ledger plate 14 which would occur if the cutter 6 rotated as rapidly as the armature 32. The train of gears above described are housed in the gear case 60 hereinbefore referred to and provided with a removable face plate 62. Said gear case 60 is secured to one side of the frame 3 and the housing 24.

By mounting the carrier wheels 2 in axial alinement with the motor 26 compactness is obtained and by having said motor 26 drive the rotary cutter 6 independently of the carrier wheels 2 said cutter 6 may be driven at normal speed irrespective of whether the lawn-mower is standing still or advancing at a steady or variable speeds. The frictional clutch members 34 and 38 enable the rotary cutter 6 to remain stationary in the event it becomes stalled while the motor 26 continues to run without danger of damaging any of the intervening mechanism.

Any suitable means for establishing an electric circuit for the operation of the motor may be provided. In the present instance I have shown a wire 56 leading to the motor 26 and a wire 58 leading from said motor. Said wires 56 and 58 are connected to a socket 60ª on the handle 12. Wires, not shown, leading to and from a source of supply may be provided with any well-known plug for connection with the socket 60ª. The last-mentioned wires may be of any suitable length to permit the lawn-mower to be pushed back and forth over a lawn and if desired said wires may be arranged upon any well known spring actuated reel so that they will be taken up or paid out as required during the operation of the lawn-mower.

From the foregoing description it is apparent that I have provided an efficient lawn-mower which is well adapted for the purpose intended and may be operated by a person without the fatigue attendant upon the manual operation of that type of lawn-mower in which the rotary cutter is driven from the carrier wheels, as with my lawn-mower it is only necessary for the operator to push the machine back and forth over a lawn while the motor 26, through the train of gears, drives the rotary cutter 6.

While I have shown and described the preferred construction, combination and arrangement of parts I reserve the right to all such changes and modifications as properly fall within the spirit and scope of the invention as claimed.

Having thus described my invention, what I claim and desire to secure by Letters Patent, is:

In combination with a lawn-mower equipped with a frame, a cutter, and carrier wheels, a gear case secured to one side of said frame, a horizontally disposed tubular housing extending transversely across the lawn-mower and secured at one end to the frame and at its opposite end to said gear case, a motor provided with a shaft journaled in said housing and extending freely through the hub of one of the carrier wheels, a shaft section arranged in axial alinement with the motor shaft and journaled in said housing, said shaft section extending freely through the hub of another carrier wheel, means through which the motor shaft drives said shaft section, and gearing in the gear case and through which said shaft section drives the cutter.

In testimony whereof I affix my signature.

WILLIAM H. ADKINS.